US009100654B2

(12) United States Patent
Kim et al.

(10) Patent No.: US 9,100,654 B2
(45) Date of Patent: Aug. 4, 2015

(54) METHOD AND APPARATUS FOR INSERTING VIDEO WATERMARK IN COMPRESSION DOMAIN

(75) Inventors: Hwan Joon Kim, Seoul (KR); Mi Suk Huh, Suwon-si (KR); Dae Youb Kim, Seoul (KR); Chee Sun Won, Seoul (KR); Sung Min Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 13/217,131

(22) Filed: Aug. 24, 2011

(65) Prior Publication Data

US 2011/0311098 A1    Dec. 22, 2011

Related U.S. Application Data

(62) Division of application No. 11/711,680, filed on Feb. 28, 2007, now Pat. No. 8,094,871.

(30) Foreign Application Priority Data

Jun. 14, 2006  (KR) .................. 10-2006-0053638

(51) Int. Cl.
*G06K 9/00* (2006.01)
*H04N 19/467* (2014.01)
*G06T 1/00* (2006.01)
*G06K 9/36* (2006.01)

(52) U.S. Cl.
CPC ............ *H04N 19/467* (2014.11); *G06T 1/0035* (2013.01); *G06T 2201/0053* (2013.01)

(58) Field of Classification Search
USPC ......... 382/100, 135, 232, 239, 250, 251, 248; 352/85, 90, 122; 380/200, 202, 217; 345/589; 713/176, 189; 704/500–503; 725/146; 726/26
See application file for complete search history.

(56) References Cited

U.S. PATENT DOCUMENTS

| | | | | |
|---|---|---|---|---|
| 5,475,434 A | * | 12/1995 | Kim ..................... | 375/240.24 |
| 5,915,027 A | * | 6/1999 | Cox et al. .............. | 380/54 |
| 6,154,571 A | * | 11/2000 | Cox et al. .............. | 382/250 |
| 6,310,962 B1 | * | 10/2001 | Chung et al. .......... | 382/100 |
| 6,332,030 B1 | * | 12/2001 | Manjunath et al. ..... | 382/100 |
| 6,332,194 B1 | * | 12/2001 | Bloom et al. .......... | 713/176 |
| 6,553,150 B1 | * | 4/2003 | Wee et al. ............. | 382/243 |
| 6,556,689 B1 | * | 4/2003 | Xia et al. .............. | 382/100 |
| 6,621,933 B2 | * | 9/2003 | Chung et al. .......... | 382/233 |

(Continued)

FOREIGN PATENT DOCUMENTS

| | | |
|---|---|---|
| JP | 2002-152742 | 5/2002 |
| JP | 2002-171494 | 6/2002 |

(Continued)

*Primary Examiner* — Hadi Akhavannik
(74) *Attorney, Agent, or Firm* — NSIP Law (57) ABSTRACT

An apparatus and method for video watermarking are provided. The apparatus and method include receiving a bit stream encoded by a video encoder by a spatial domain information analyzer and extracting information from a spatial domain of an image with respect to code words forming the bit stream, grouping the code words for each segmented domain by a domain classifier based on the information from the spatial domain, determining a sign of the each segmented domain by a domain sign determiner and inserting a watermark in the each segmented domain according to the sign determined by the domain sign determiner by a watermark bit inserter.

12 Claims, 9 Drawing Sheets

(56) References Cited

U.S. PATENT DOCUMENTS

| | | | |
|---|---|---|---|
| 6,738,493 B1* | 5/2004 | Cox et al. | 382/100 |
| 6,748,362 B1* | 6/2004 | Meyer et al. | 704/500 |
| 6,768,980 B1* | 7/2004 | Meyer et al. | 704/500 |
| 6,809,792 B1* | 10/2004 | Tehranchi et al. | 352/85 |
| 6,973,130 B1* | 12/2005 | Wee et al. | 375/240.16 |
| 7,496,197 B2* | 2/2009 | Troyansky et al. | 380/202 |
| 7,707,422 B2* | 4/2010 | Shin et al. | 713/176 |
| 7,779,271 B2* | 8/2010 | Langelaar | 713/189 |
| 7,933,407 B2* | 4/2011 | Keidar et al. | 380/200 |
| 2001/0021260 A1* | 9/2001 | Chung et al. | 382/100 |
| 2002/0129253 A1* | 9/2002 | Langelaar | 713/176 |
| 2002/0146123 A1* | 10/2002 | Tian | 380/234 |
| 2002/0178368 A1* | 11/2002 | Yin et al. | 713/186 |
| 2003/0174858 A1* | 9/2003 | Kim et al. | 382/100 |
| 2004/0022444 A1* | 2/2004 | Rhoads | 382/232 |
| 2004/0125952 A1* | 7/2004 | Alattar et al. | 380/202 |
| 2004/0258243 A1* | 12/2004 | Shin et al. | 380/210 |
| 2007/0291980 A1* | 12/2007 | Kim et al. | 382/100 |
| 2010/0146284 A1* | 6/2010 | Geyzel et al. | 713/176 |
| 2010/0177891 A1* | 7/2010 | Keidar et al. | 380/200 |
| 2013/0272522 A1* | 10/2013 | Keidar et al. | 380/201 |

FOREIGN PATENT DOCUMENTS

| | | |
|---|---|---|
| JP | 2004-166018 | 6/2004 |
| JP | 2004-304834 | 10/2004 |
| KR | 10-2001-0024001 | 3/2001 |
| KR | 10-2001-0074604 A | 8/2001 |
| KR | 10-2002-0088086 | 11/2002 |
| WO | WO 2005/004493 A1 | 1/2005 |
| WO | WO 2005/004494 A1 | 1/2005 |

* cited by examiner

METHOD AND APPARATUS FOR INSERTING VIDEO WATERMARK IN COMPRESSION DOMAIN

CROSS-REFERENCE TO RELATED APPLICATIONS

This application is a divisional of U.S. patent application Ser. No. 11/711,680 filed on Feb. 28, 2007, now U.S. Pat. No. 8,094,871, which claims the benefit under 35 U.S.C. §119(a) of Korean Patent Application No. 10-2006-0053638, filed on Jun. 14, 2006, in the Korean Intellectual Property Office, the entire disclosure of which is hereby incorporated by reference.

BACKGROUND OF THE INVENTION

1. Field of the Invention

The present invention relates to a video watermarking apparatus and method. More particularly, the present invention relates to an apparatus and method of watermarking a video in a compression domain, substantially resisting recompression of the video.

2. Description of the Related Art

Generally, due to the widespread use of digital media and various multimedia data transmission and storage devices, and the development of authoring tools, multimedia data may be easily copied and distributed via a network. Therefore, new services are being provided. However, a problem of adequately protecting the copyright of the digital media has seriously escalated.

Watermarking is used for protecting the copyright of digital media. Watermarking is a method of inserting a watermark, which is a signature of an author or information identifying the author, into the digital media. The watermark is to solve the problem of protecting the copyright of the digital media by inserting the watermark into the digital media so that when a problem of proving copyright infringement occurs, the watermark may be extracted to show proof of copyright ownership.

Methods of watermarking may be classified into a method of watermarking in a spatial domain, and a method of watermarking in a compression domain.

Since various algorithms may be applied to conventional methods of watermarking in the spatial domain, it has the merit of substantially resisting various attacks.

However, most video is encoded while stored and transmitted. Therefore, to apply the method of watermarking in the spatial domain, an entire encoded video has to be decoded and the decoded video has to be encoded again after inserting a watermark into the decoded video. This presents a cumbersome problem of inserting the watermark and encoding the decoded video again. Also, there is a large amount of computation required by a process of decoding the entire video.

As a method of reducing the large amount of computation, watermarking in the compression domain is provided, which operates in a bit stream of the compression domain. However, in conventional methods of watermarking in the compression domain, since a watermark is directly inserted into/extracted from an encoded discrete cosine transform (DCT) coefficient, there is a problem of being relatively ineffective against a recompression attack of a video.

As representative examples of conventional methods of watermarking in a compression domain, there are Hartung, Cox, and Langelaar methods. The Hartung method, disclosed in U.S. Pat. No. 5,915,027, has a disadvantage of requiring a large amount of computation because a very complex circuit is required for preventing error propagation and an increase of bit rates.

In the Cox method, disclosed in U.S. Pat. No. 5,915,027, since an inserted watermark affects only frequency features of data in a compression domain, it is subject to a simple and effective attack when there is a change in bit rates and frame structures. Also, recompression of a video and additional computation caused by shaping of the watermark is required.

In the Langelaar method, mentioned in U.S. Pat. Nos. 6,768,980 and 6,748,362, very quick computation is possible in a compression domain but there is a disadvantage of having a structure that is very weak in a recompression of a video.

Accordingly, there is a need for an improved apparatus and method for inserting a video watermark in a compression domain.

SUMMARY OF THE INVENTION

Exemplary embodiments of the present invention address at least the above problems and/or disadvantages and provide at least the advantages described below. Accordingly, an aspect of the present invention is to provide an apparatus and method of watermarking a video in a compression domain, capable of substantially resisting against a recompression attack.

An aspect of the present invention also provides an apparatus and method of watermarking a video, capable of inserting a watermark resisting against recompression, by causing a change in a certain feature by operation of a bit stream in a compression domain.

An aspect of the present invention also provides an apparatus and method of watermarking a video, capable of directly inserting a watermark in a compression domain.

An aspect of the present invention also provides an apparatus and method of watermarking a video, in which there is a decreased load on memory.

According to an aspect of the present invention, there is provided a video watermarking apparatus including a spatial domain information analyzer receiving a bit stream encoded by a video encoder and extracting information from a spatial domain of an image with respect to code words forming the bit stream, a domain classifier grouping the code words for each segmented domain, based on the information from the spatial domain, a domain sign determiner determining a sign of the each segmented domain and a watermark bit inserter inserting a watermark in the each segmented domain according to the sign determined by the domain sign determiner.

In this case, the spatial domain of the image may be segmented into the same form or may be segmented into two or more mutually different forms.

In this case, the sign of each segmented domain may be determined according to a bit of the watermark.

In an exemplary embodiment, the encoder may be an MPEG-2 encoder.

According to another aspect of the present invention, there is provided a video watermark detection apparatus including a parameter extractor receiving an compressed digital video data and providing spatial information of an image, a bit stream grouping unit grouping the received compressed digital video data based on the spatial information of the image of the compressed digital video data, a domain classifier receiving a decoded digital video and classifying spatial domain data of an image and a watermark detector extracting a watermark bit inserted for each domain, from data of each domain grouped into a spatial domain by the bit stream grouping unit and the domain classifier.

According to still another aspect of the present invention, there is provided a video watermarking apparatus including a spatial domain information analyzer receiving a bit stream encoded by a video encoder and extracting information from a spatial domain of an image with respect to code words forming the bit stream, a spatial domain classifier grouping the code words for each segmented domain, based on the information with respect to the spatial domain, a domain sign determiner determining a sign of the each segmented domain, a watermark bit inserter inserting a watermark in the each segmented domain according to the sign determined by the domain sign determiner, a parameter extractor receiving a compressed digital video data and providing spatial information of an image, a bit stream grouping unit grouping the received compressed digital video data based on the spatial information of the image of the compressed digital video data, a domain classifier receiving a decoded digital video and classifying spatial domain data of an image and a watermark detector extracting a watermark bit inserted for each domain, from data of each domain grouped into a spatial domain by the bit stream grouping unit and the domain classifier.

According to yet another aspect of the present invention, there is provided a video watermarking method including grouping encoded video bit streams for each certain domain in a spatial domain, inserting a watermark into each of the grouped bit streams and recombining the each of the grouped bit streams group including the watermark.

In an exemplary embodiment, the operation of grouping encoded video bit streams may include extracting information from the spatial domain of an image with respect to code words forming the encoded video bit stream and grouping the encoded video bit stream for the each certain domain in the spatial domain, based on the information with respect to the spatial domain.

In an exemplary embodiment, the operation of inserting a watermark may include determining a sign for each of the grouped certain domains and inserting the watermark into each domain according to the determined sign.

In an exemplary embodiment, when the bit stream is an MPEG-2 bit stream, the watermark may be inserted into a discrete cosine transform (DCT) DC coefficient.

In an exemplary embodiment, the watermark may be inserted into a part of or all of the code words forming the grouped bit stream.

In an exemplary embodiment, the watermark insertion may be performed according to an equation as below, $$\text{Code}'_i(k) = \text{Code}_i(k) + s(i)w(k),$$

wherein $\text{Code}_i$ is a group of code words included in a segmented domain i, $s(i)$ is a sign of the domain i, $w(k)$ is a watermark gain factor, and $\text{Code}'_i$ is a group of code words including a watermark of the domain i.

According to a further aspect of the present invention, there is provided a video watermark detection method including extracting spatial information of an image in a bit stream including a watermark, grouping the bit stream including the watermark, based on the spatial information and extracting the included watermark from the grouped bit stream.

In an exemplary embodiment, the watermark included in the bit stream may be detected in a luminance component of the bit stream.

In an exemplary embodiment, an equation with respect to the luminance component of the bit stream and an equation with respect to a watermark signal with respect to each domain may be as below, $$L'(l) = \left\{ \sum_{x,y \in Blk'(l)} I'(x,y) \right\} >> 6$$

$$L(l) = \left\{ \sum_{x,y \in Blk'(l)} I'(x,y) \right\} >> 6$$

$$w_i = \text{sign}\left\{ \sum_{l \in i} (L'(l) - L(l)) \right\},$$

wherein $I'(x,y)$ is an image including a watermark, $I(x,y)$ is an original image, $L'(1)$ is a luminance component of $1^{th}$ 8×8 blocks of $I'(x,y)$, $L(1)$ is a luminance component of 8×8 blocks of $I(x,y)$, and $w_i$ is a watermark signal of i domain.

BRIEF DESCRIPTION OF THE DRAWINGS

The above and/or other aspects and advantages of the present invention will become apparent and more readily appreciated from the following detailed description, taken in conjunction with the accompanying drawings of which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention and are merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness. Reference will now be made in detail to exemplary embodiments of the present invention.

Figure 1:
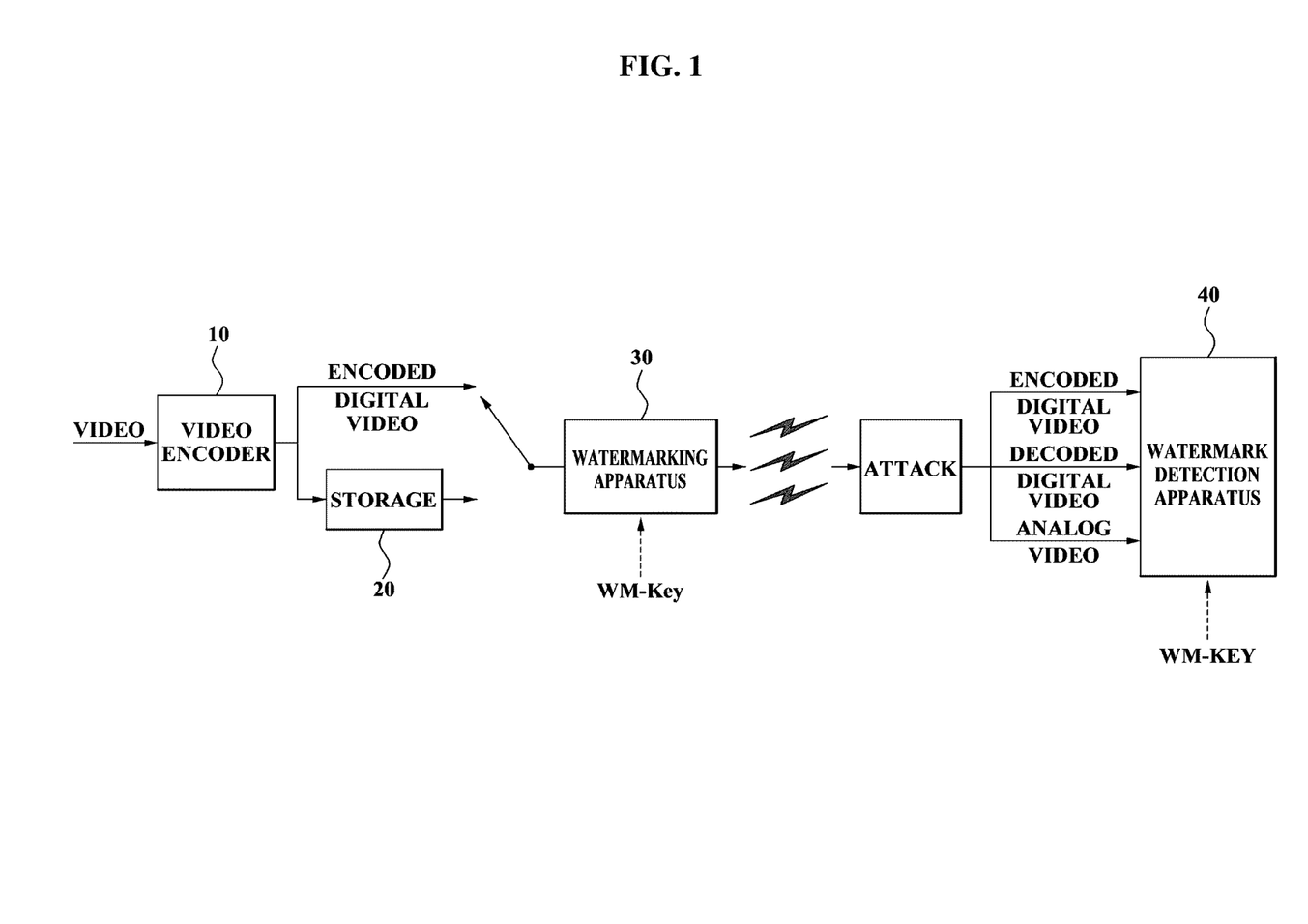
FIG. 1 is a block diagram illustrating a system according to an exemplary embodiment of the present invention.

FIG. 1 is a block diagram illustrating a system according to an exemplary embodiment of the present invention. Referring to FIG. 1, the system includes a video encoder 10, a storage apparatus 20, a watermarking apparatus 30, and a watermark detection apparatus 40.

The video encoder 10 encodes external analog video data to reduce an amount of data of the analog video data. In this case, the encoded data is stored in the storage apparatus 20 or transmitted.

The watermarking apparatus 30 inserts a watermark into the encoded data, namely an encoded bit stream, to prepare against intentional attacks such as recompression of the video and an attack when the video is in a compressed digital video data form or analog form. The watermarking apparatus 30 segments the encoded bit stream of an image into bit stream groups with respect to a spatial domain, inserts a watermark of one bit into each bit stream group, recombines each bit stream group including the watermark, and transmits corresponding video contents including the watermark.

The watermark detection apparatus 40 detects a watermark from an intentionally attacked digital video content or normally received digital video content. In this case, the watermark detection apparatus 40 detects the watermark regardless of a video form such as video content deformed by the intentional attack or normally received video content.

A watermark-key, input to the watermarking apparatus 30 and the watermark detection apparatus 40, is used for more securely inserting a watermark by using a key when the watermark is inserted, such as scrambling. The watermark-key is well known to those skilled in the art and may be applied to exemplary embodiments of the present invention. Accordingly, hereinafter, a configuration of the watermark key will be omitted.

Figure 2:
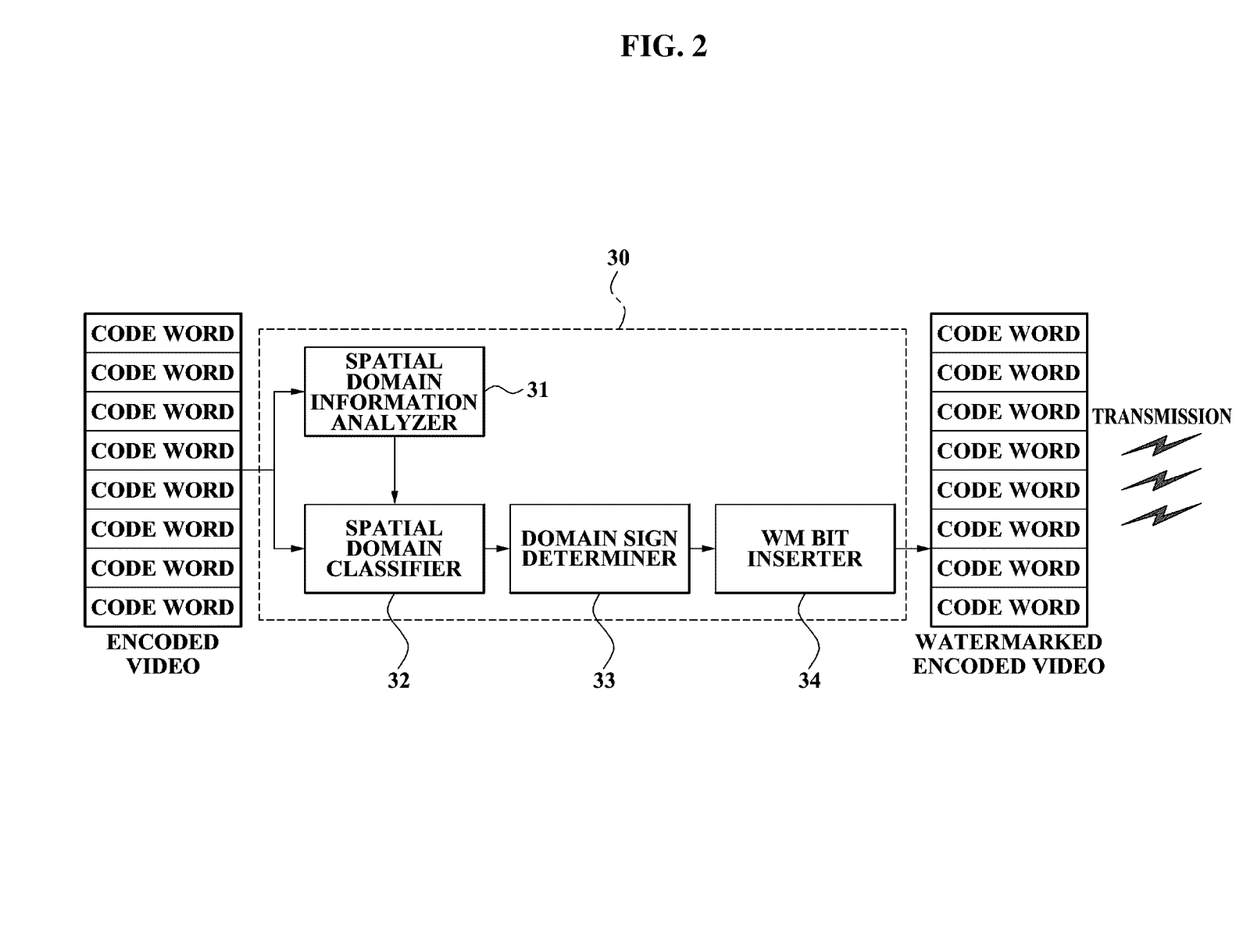
FIG. 2 is a block diagram illustrating a detailed configuration of an exemplary watermarking apparatus shown in FIG. 1.

FIG. 2 is a block diagram illustrating a detailed configuration of the watermarking apparatus 30 shown in FIG. 1. Referring to FIG. 2, the watermarking apparatus 30 includes a spatial domain information analyzer 31, a spatial domain classifier 32, a domain sign determiner 33, and a watermark bit inserter 34.

The spatial domain information analyzer 31 receives an encoded bit stream transformed by the video encoder 10 and extracts information on a spatial domain of an image, such as width, length, and size of the image, from code words forming the encoded bit stream. Namely, in order to segment and group the encoded bit stream into the spatial domain of the image, the information on the spatial domain of the image is extracted from the code words.

The spatial domain classifier 32 receives the bit stream encoded by the video encoder 10 and the information on the spatial domain from the code words forming the bit stream, extracted by the spatial domain information analyzer 31. The spatial domain classifier 32 classifies the encoded bit stream into domains or sub-images based on the information on the spatial domain from the code words received from the spatial domain information analyzer 31. Namely, to show respectively segmented domains in the spatial domain, the encoded bit stream is grouped according to domains or sub-images of the spatial domain. In this case, grouping the encoded bit stream by the domain classifier 32 varies with a segmented form and a number of sub-images in the spatial domain, and will be described referring to FIG. 3.

Figure 3:
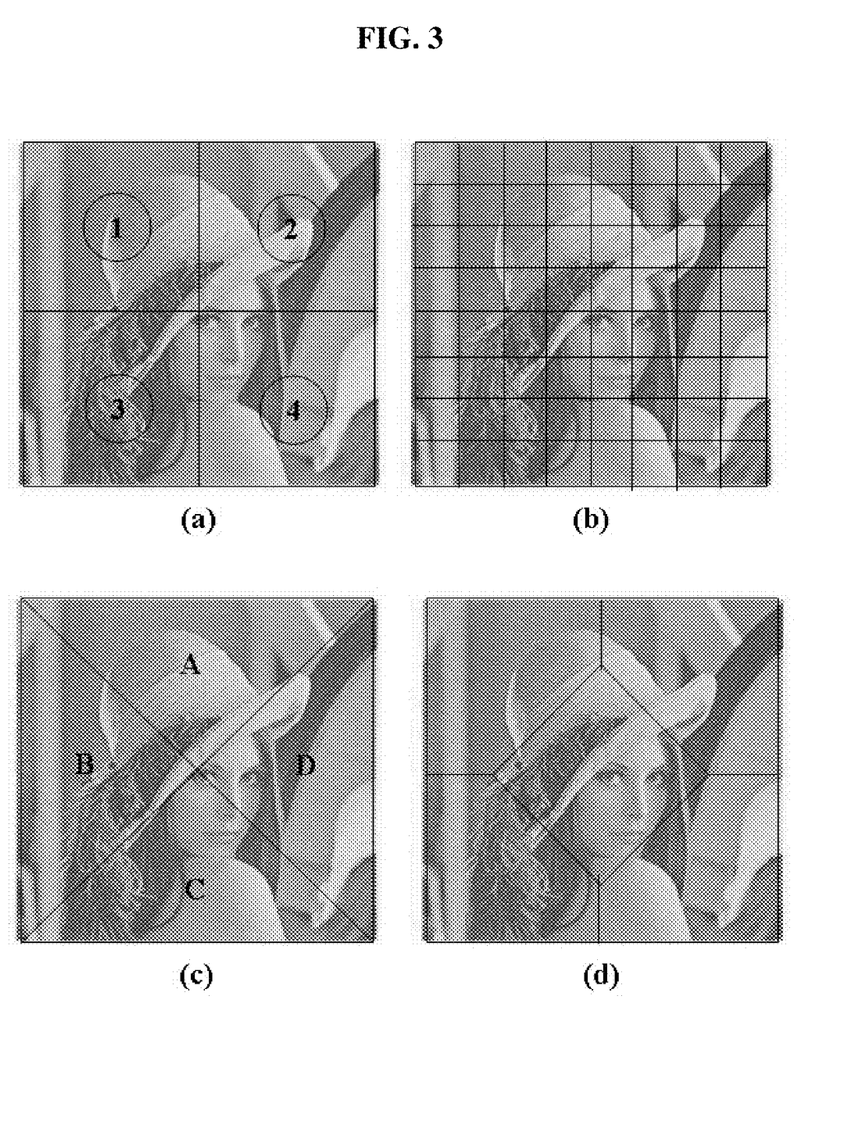
FIG. 3 illustrates examples of a segmented form of an image in a spatial domain.

FIG. 3 illustrates examples of a segmented form of an image in a spatial domain. A number of segmented images, called sub-images, may be controlled by a trade-off between payload and robustness.

Referring to FIG. 3, in the spatial domain, the image may be segmented into four domains or sub-images whose widths and lengths are identical, as shown in (a), the width and the length of the image may be segmented into a plurality of domains or sub-images, as shown in (b), the image may be diagonally segmented, as shown in (c), and the image may be segmented into two different shapes, as shown in (d).

The spatial domain classifier 32 groups a bit stream corresponding to each domain or sub-image of an image based on segmentation information in a spatial domain, such as the examples shown in FIG. 3, and information on the spatial domain of each code word forming the bit stream, extracted by the spatial domain information analyzer 31. For example, referring to (a) and (c) in FIG. 3, the domain classifier 32 groups the bit stream corresponding to each of segmented domains 1, 2, 3 and 4 of (a) and A, B, C, and D of (c), which are segmented domains or sub-images of the image, based on the information on the spatial domain from the code words.

The domain sign determiner 33 determines a sign with respect to each domain or sub-image of the image in the spatial domain grouped by the domain classifier 32. The sign is determined according to a bit of a watermark that will be inserted. For example, when a watermark that will be inserted into a certain domain is "1", a sign of a corresponding domain is determined to be "+". When a watermark that will be inserted is "0", a sign of a corresponding domain is determined to be "−". Of course, a value of the watermark and a sign corresponding to the value is not limited to the one case. Namely, when a watermark is "1", a sign of a corresponding domain may be determined to be "−", and when a watermark is "0", a sign of a corresponding domain may be determined to be "+". Hereinafter, it is described assuming as a watermark "1" is inserted when a sign of a domain is "+" and a watermark "0" is inserted when a sign of a domain is "−".

When the domain sign determiner 33 determines the sign of each domain or sub-image segmented from the spatial domain, the watermark bit inserter 34 inserts a watermark with respect to a corresponding sign into a part of or an entire bit stream grouped for each domain or sub-image, according to the sign of each domain. This will be described referring to FIG. 4.

Figure 4:
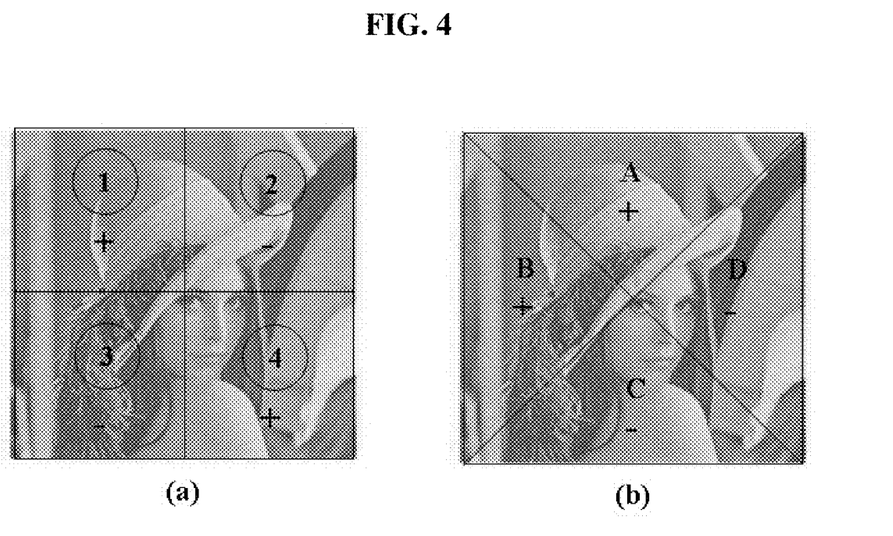
FIG. 4 illustrates examples of assigning a sign for each domain of the image.

FIG. 4 illustrates examples of assigning a sign for each domain or sub-image of the image. Referring to FIG. 4, a watermark "1" is inserted into some or all code words forming the domains 1 and 4 of (a) and the domains A and B of (b), whose sign is determined to be "+", and a watermark "0" is inserted into some or all code words forming the domains 2 and 3 of (a) and C and D of (b), whose sign is determined to be "−". In this case, a sign of a block located on a boundary face of the segmented domain depends on an included area.

When the watermark is inserted into some or all of the code words forming the bit stream grouped into the segmented domain, the bit stream including the watermark is recombined in the form of an encoded bit stream and video contents are transmitted to a desired place. In an exemplary embodiment, the video encoder 10 may recombine the bit stream to form an encoded bit stream.

Figure 5:
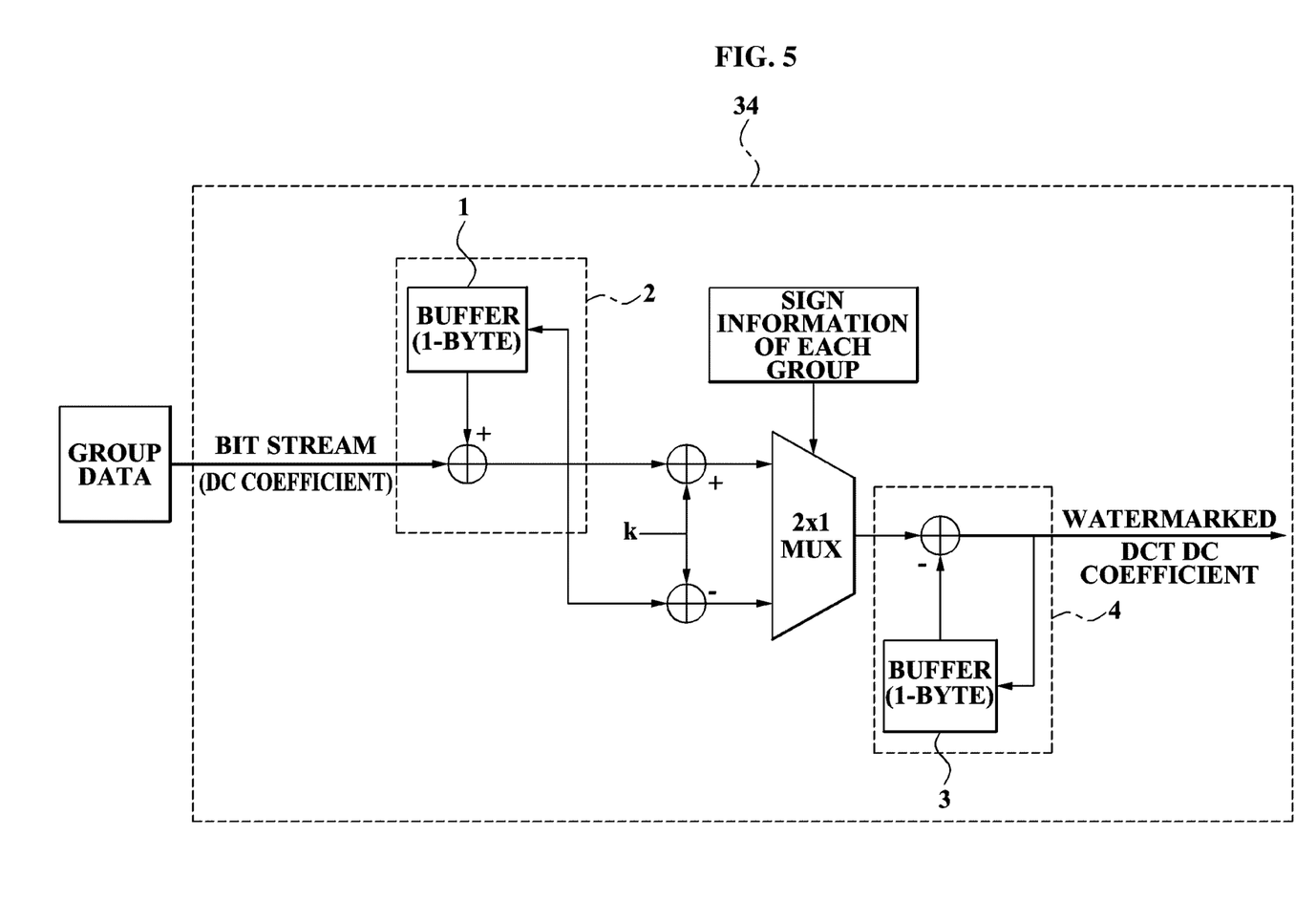
FIG. 5 is a block diagram illustrating a detailed configuration of an exemplary watermark bit inserter when a video encoder shown in FIG. 1 is an MPEG encoder.

FIG. 5 is a block diagram illustrating a detailed configuration of an exemplary watermark bit inserter 34 when the video encoder 10, shown in FIG. 1, comprises an MPEG encoder. Each grouped data input to the watermark bit inserter 34 indicates data grouped with respect to code words of each domain or sub-image segmented from the spatial domain by the domain classifier 32.

In the case of an MPEG-2 bit stream, a DCT DC coefficient indicating spatial data, for example luminance, of an intra-encoded frame becomes an object of an operation k for a watermark. Accordingly, in an exemplary embodiment, a watermark signal is inserted into the DCT DC coefficient of a luminance component of the image in a compression domain to provide an effect of the watermark in the spatial domain.

Referring to FIG. 5, the watermark bit inserter 34 for the MPEG-2 bit stream receives a DCT DC coefficient extracted from data of each grouped bit stream and extracts a precise DC value of a corresponding block by using an inverse DPCM unit 2. In this case, a buffer 1 of 1 byte is used as a temporary storage space for a current DC coefficient of the inverse DPCM. After the operation k for the DC coefficient for the watermark using sign information of each group, the DC coefficient is changed into a form suitable for MPEG-2 format by a DPCM execution unit 4. In this case, a buffer 3 that is a storage space of 1 byte is also used.

Via the process, a watermark may be inserted into a DCT DC coefficient, a bit stream having the DCT DC coefficient including the watermark may be recombined, and contents may be transmitted to a desired place.

Figure 6:
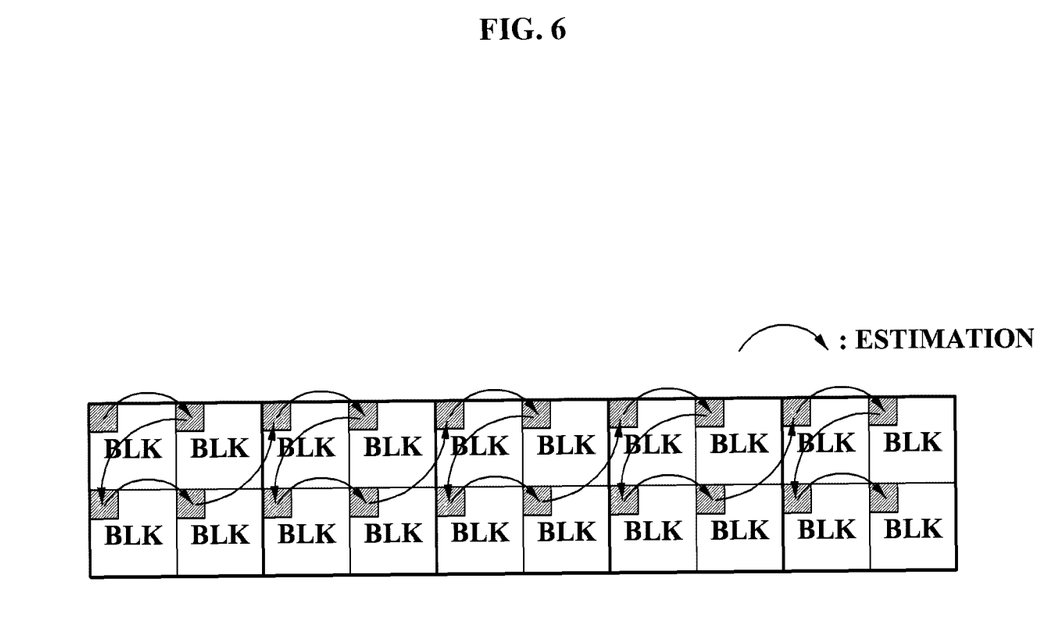
FIG. 6 is a diagram illustrating an exemplary process of encoding a DC coefficient using differential pulse code modulation (DPCM) to describe a use of a buffer shown in FIG. 5.

FIG. 6 is a diagram illustrating an exemplary process of encoding a DC coefficient using DPCM to describe a use of the buffer shown in FIG. 5. Referring to FIG. 6, it can be seen that each DC coefficient is estimated and encoded in the same order in the same slice. Accordingly, since a DC coefficient extracted from an MPEG-2 bit stream is different from a DC coefficient, a buffer of 1 byte for an inverse DPCM is required to extract a precise DC value of a corresponding block.

As described above, the watermark bit inserter 34 inserts a watermark into a grouped bit stream, which may be shown as Equation 1.

$$Code'_i(k) = Code_i(k) + s(i)w(k) \quad \text{[Equation 1]}$$

In this case, $Code'_i$ is a group of code words including a watermark of the domain i, $Code_i$ is a group of code words included in a segmented domain i, s(i) is a sign, −1 or +1, of the domain i, and w(k) is a watermark gain factor, in which w(k)≥0. In this case, since w(k) includes "0", a watermark signal may be inserted into only a part of the code words of one domain.

The watermarking apparatus 30 inserts a watermark into some or all code words of each domain segmented from a spatial domain, using Equation 1. When the bit stream including the watermark is recombined and transmitted, the watermark detection apparatus 40 detects the watermark inserted in to contents.

Figure 7:
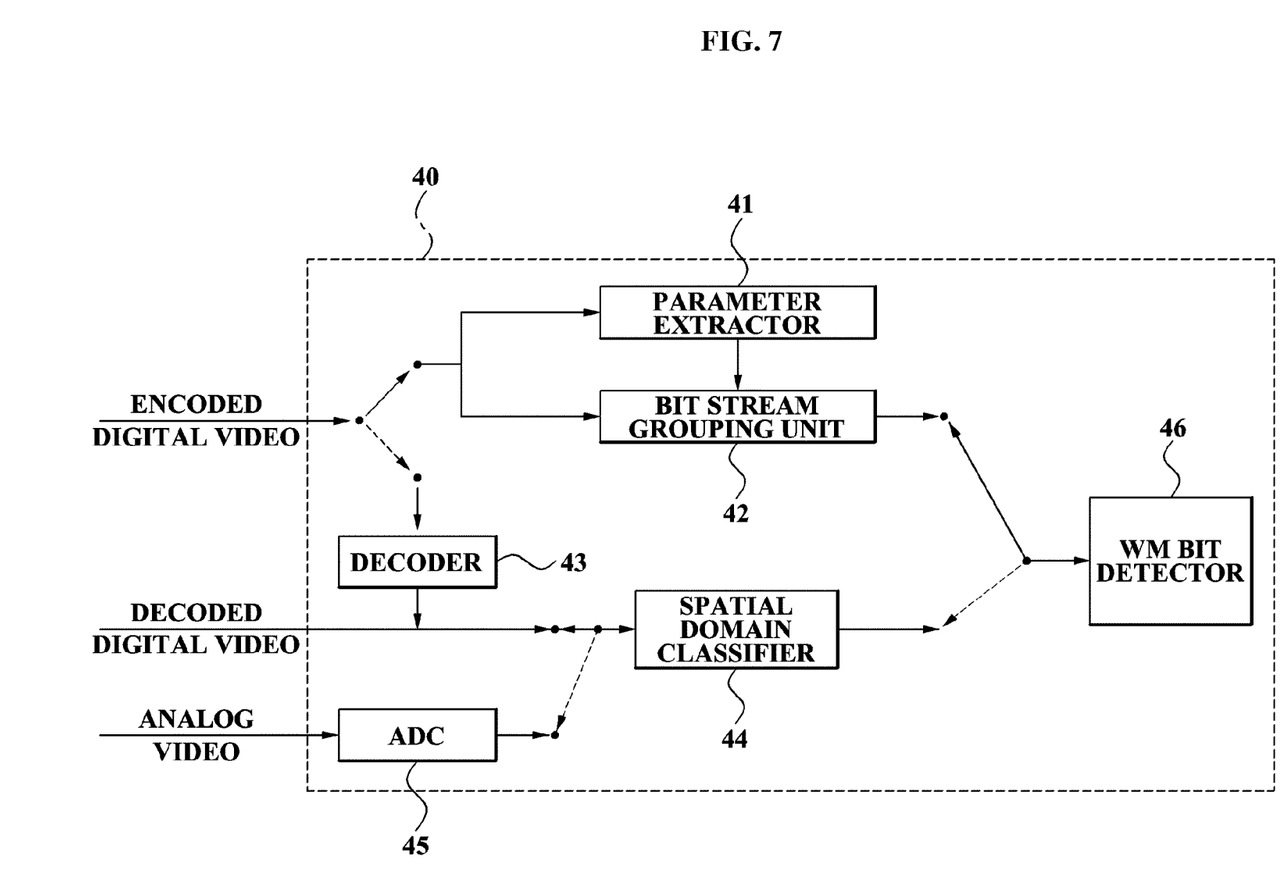
FIG. 7 is a block diagram illustrating a detailed configuration of an exemplary watermark detection apparatus shown in FIG. 1.

FIG. 7 is a block diagram illustrating a detailed configuration of an exemplary watermark detection apparatus 40 shown in FIG. 1. Referring to FIG. 7, the watermark detection apparatus includes a parameter extractor 41, a bit stream grouping unit 42, a decoder 43, a spatial domain classifier 44, an analog/digital converter (ADC) 45, and a watermark bit detector 46.

In an exemplary case, all kinds of video forms, such as compressed digital video data, decoded digital video, and analog video, may be input to the watermark detection apparatus 40.

The parameter extractor 41 receives compressed digital video data and provides spatial information of an image, required by the bit stream grouping unit 42, such as information on width, length, and size of the image.

The bit stream grouping unit 42 groups the compressed digital video data based on the spatial information of the image of the compressed digital video data, extracted by the parameter extractor 41.

In an exemplary case, the parameter extractor 41 and the bit stream grouping unit 42 may perform operations similar to the spatial domain information analyzer 31 and the spatial domain classifier 32 shown in FIG. 2.

In an exemplary case, the compressed digital video data may be expressed as digital data decoded by the decoder 43.

The spatial domain classifier 44 receives the decoded digital video and classifies spatial domain data of the image. In an exemplary embodiment, the spatial domain data may comprise pixels of the image.

The ADC 45 receives, digitalizes, and outputs an analog video to the spatial domain classifier 44. The spatial domain classifier 44 classifies the digitalized analog video data into each domain.

The watermark bit detector 46 detects a watermark bit inserted for each domain or sub-image, from data of each domain grouped into a spatial domain by the bit stream grouping unit 42 or the spatial domain classifier 44.

Figure 8:
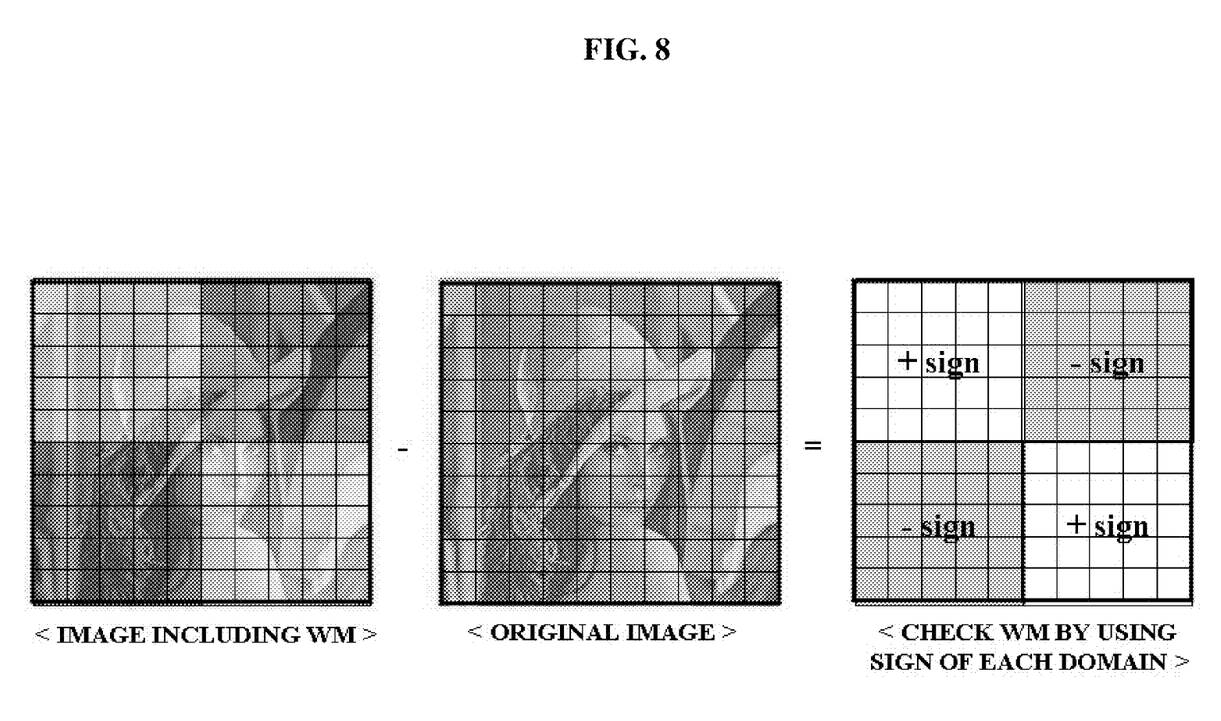
FIG. 8 is a diagram illustrating an example of a watermark detected by the watermark detection apparatus shown in FIG. 7.

FIG. 8 is a diagram illustrating an example of a watermark detected by the exemplary watermark detection apparatus 40 shown in FIG. 7. Referring to FIG. 8, by a result of grouping an encoded bit stream and inserting a watermark into each encoded bit stream group, it may be shown that the watermark is inserted into a certain area of a domain segmented from a spatial domain. Namely, an effect of watermarking a domain segmented from a spatial domain, in other words a sub-image, which sufficiently resists recompression by quickly watermarking in a compression domain, is shown.

In an exemplary embodiment, grouping the bit stream in the compression domain may be included in a certain domain in the spatial domain, as shown in FIG. 8.

When the image is encoded by an MPEG-2 encoder, the watermark detection apparatus 40 detects a watermark by using a DCT DC coefficient including the watermark. In an exemplary embodiment, the DCT DC coefficient indicates a luminance component.

The luminance component and a watermark signal with respect to each domain of the image, detected by the watermark detection apparatus 40 are expressed by Equation 2 and Equation 3, respectively.

$$L'(l) = \left\{ \sum_{x,y \in Blk'(l)} I'(x,y) \right\} >> 6 \quad \text{[Equation 2]}$$

$$L(l) = \left\{ \sum_{x,y \in Blk(l)} I(x,y) \right\} >> 6$$

In this case, I'(x,y) is an image including a watermark, I(x,y) is an original image, L'(1) is a luminance component of $1^{th}$ 8×8 blocks of I'(x,y), and L(1) is a luminance component of $1^{th}$ 8×8 blocks of I(x,y).

$$w_i = \text{sign}\left\{ \sum_{l \in i} (L'(l) - L(l)) \right\} \quad \text{[Equation 3]}$$

In this case, i indicates each segmentation domain of the segmented image. When the image is segmented into n number of domains, 0≤i≤n, and $w_i$ is a watermark signal.

As described above, the present invention may be applied to various fields such as broadcasting monitoring, preventing illegal copying and distribution of videos, enhancing medical images, and interactive TV.

In an exemplary case of broadcasting monitoring, message information such as a name of a company and a broadcasting time may be inserted as a watermark, for an automatic monitoring system with respect to contents of broadcasting programs or televising advertisements.

In an exemplary case of preventing the illegal copying and distribution of videos, a unique watermark may be inserted into each copied video to prevent illegal copying and distribution, thereby recognizing a pirate copy of the video by extracting a watermark of a corresponding video when an illegally copied and distributed video is found.

In an exemplary case of medical images, a serious medical mistake caused by losing, missing, and/or switching an image may be prevented by recording a name, age, name of a disease, and/or condition of a patient as a watermark.

In an exemplary case of interactive TV, a caption requiring an additional channel may be processed without the additional channel by watermarking. When features of all broadcasted things, such as a price, a place of origin, or a maker of a dress worn on a certain person, are inserted as a watermark, home shopping may be performed in real time without an additional channel.

Figure 9:
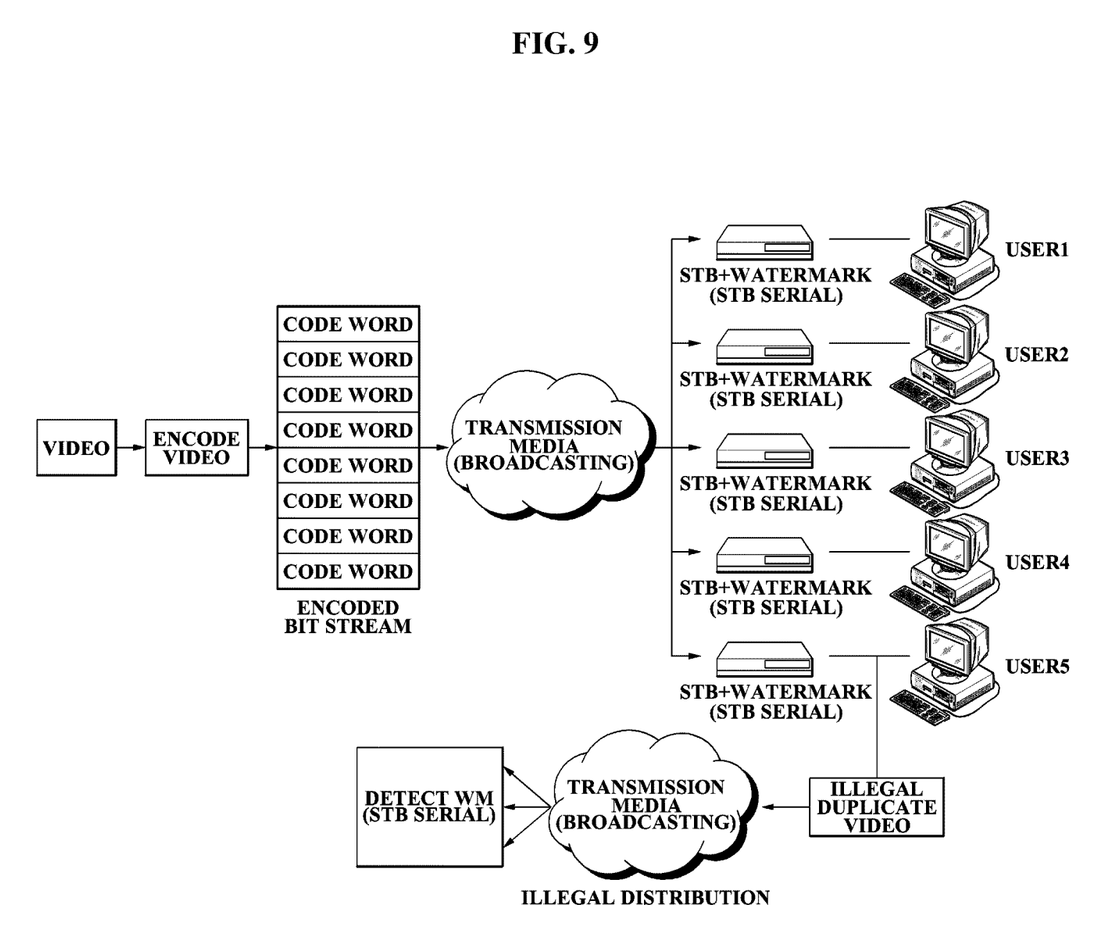
FIG. 9 is a diagram illustrating an example of preventing illegal copy and distribution of a video from fields to which the present invention can be applied.

FIG. 9 is a diagram illustrating an exemplary case of preventing illegal copying and distribution of a video, from the fields to which the present invention can be applied. Referring to FIG. 9, a process of pursuing an illegal copy of videos will be described.

When an original video is encoded by a video encoder, such as an MPEG-2 encoder, an encoded bit stream is transmitted by transmission media.

The bit stream is transmitted to user1, user2, user3, user4, and user5 via set-top boxes (STBs). In this case, the STB inserts a serial number of the set-top box as a watermark into a corresponding image. The serial number of the set-top box is inserted by the watermarking apparatus 30 included in the set-top box. The watermarking apparatus 30 groups code words forming the bit stream into each segmented domain and inserts the serial number of the set-top box into some or all of the code words grouped into each segmented domain, as a watermark.

The serial number of the set-top box is inserted into the bit stream in a compression domain as the watermark. When a video is illegally copied and distributed via the transmission media by the user5, a contents provider providing the original video may detect that the user5 illegally copied and distributed the video by detecting the serial number of the set-top box from the watermark detected from the illegally copied and distributed video.

An exemplary aspect of the present invention provides an apparatus and method of watermarking a video in a compression domain, capable of substantially resisting against a recompression attack by grouping an encoded bit stream into domains segmented from a spatial domain and inserting a watermark into some or all of grouped code words.

An exemplary aspect of the present invention also provides an apparatus and method of watermarking in a compression domain, capable of watermarking in a spatial domain.

An exemplary aspect of the present invention also provides an apparatus and method of watermarking a video, capable of substantially resisting against recompression after changing a size of a group of images and an encoding parameter, and recompression into other formats such as MPEG-4, since a watermark in a compression domain has an effect on a spatial domain of an image.

An exemplary aspect of the present invention also provides an apparatus and method of watermarking a video, capable of being applied to an encoded video by other encodings in addition to MPEG.

Certain exemplary embodiments of the present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

Although a few exemplary embodiments of the present invention have been shown and described, the present invention is not limited to the described embodiments. Instead, it should be appreciated by those skilled in the art that changes may be made to these exemplary embodiments without departing from the principles and spirit of the invention, the scope of which is defined by the claims and their full scope of equivalents.

What is claimed is:

1. A video watermarking method comprising:
    detecting spatial domain information of an image from code words of a compressed video bit stream while in a compression domain;
    segmenting the image corresponding to the compressed video bit stream into a plurality of segments with respect to the spatial domain, based on the spatial domain information of the image detected from the code words of the compressed video bit stream while the image is in the compression domain;
    inserting a watermark into a segment among the plurality of segments while in the compression domain such that a group of the code words that includes the watermark is based on a group of the code words included in the segment, a sign of the segment and a watermark gain factor, the watermark generating an effect in the segment when the segment is transformed to the spatial domain; and
    recombining the segment including the watermark.

2. The method of claim 1, wherein the inserting the watermark comprises:
    determining a sign for each segment of the plurality of segments of the spatial domain; and
    inserting the watermark into each segment according to the determined sign.

3. The method of claim 1, wherein the compressed video bit stream comprises a compressed MPEG-2 bit stream and the inserting the watermark comprises inserting the watermark into a discrete cosine transform (DCT) DC coefficient.

4. The method of claim 3, wherein the inserting the watermark comprises inserting the watermark into a luminance component of the DCT DC coefficient.

5. The method of claim 1, wherein the inserting the watermark comprises inserting the watermark into a code word of each of the one or more segments.

6. The method of claim 1, wherein the segments of the spatial domain comprise the same form.

7. The method of claim 1, wherein the segments of the spatial domain comprise two or more mutually different forms.

8. The method of claim 1, wherein the encoded video bit stream comprises an MPEG-2 bit stream.

9. The method of claim 1, wherein the encoded video bit stream comprises an MPEG-4 bit stream.

10. The method of claim 1, wherein the inserting the watermark comprises inserting the watermark according to an equation as below, $$\text{Code}'_i(k) = \text{Code}_i(k) + s(i)w(k),$$

wherein $\text{Code}_i$ is a group of code words included in a segment i, s(i) is a sign of the segment w(k) is a watermark gain factor, and $\text{Code}'_i$ is a group of code words including a watermark of the segment i.

11. A non-transitory computer-readable storage medium having stored thereon instructions for executing a video watermarking method, the method comprising:
   detecting spatial domain information of an image from code words of a compressed video bit stream while in a compression domain;
   segmenting the image corresponding to the compressed video bit stream into a plurality of segments with respect to the spatial domain, based on the spatial domain information of the image detected from the code words of the compressed video bit stream while the image is in the compression domain;
   inserting a watermark into a segment among the plurality of segments while in the compression domain such that a group of the code words that includes the watermark is based on a group of the code words included in the segment, a sign of the segment and a watermark gain factor, the watermark generating an effect in the segment when the the segment is transformed to the spatial domain; and
   recombining the segment including the watermark.

12. A video watermarking apparatus comprising:
   a spatial domain analyzer configured to detect spatial domain information of an image from code words of a compressed video bit stream while in a compression domain;
   a spatial domain classifier configured to segment the image corresponding to the compressed video bit stream into a plurality of segments with respect to the spatial domain, based on the spatial domain information of the image detected from the code words of the compressed video bit stream while the image is in the compression domain; and
   an inserter configured to insert a watermark into one or more of the segments while in the compression domain such that a group of the code words that includes the watermark is based on a group of the code words included in the segment, a sign of the segment and a watermark gain factor, and to recombine the segment including the watermark,
   wherein the watermark generates an effect in the segment when the segment is transformed to the spatial domain.

* * * * *